United States Patent [19]

Pokora et al.

[11] Patent Number: 4,647,952
[45] Date of Patent: Mar. 3, 1987

[54] PHENOLIC DEVELOPER RESINS

[75] Inventors: Alexander R. Pokora, Reynoldsburg; William L. Cyrus, Jr., Ray, both of Ohio

[73] Assignee: The Mead Corporation, Dayton, Ohio

[21] Appl. No.: 797,585

[22] Filed: Nov. 13, 1985

[51] Int. Cl.$^4$ .............................................. B41M 5/22
[52] U.S. Cl. .................................. 346/210; 346/211; 346/212; 346/225; 427/150
[58] Field of Search ............... 346/210, 211, 212, 216, 346/217, 225; 427/150, 151, 152

[56] References Cited

U.S. PATENT DOCUMENTS

| | | | |
|---|---|---|---|
| 3,244,549 | 4/1966 | Farnham et al. | 117/36.2 |
| 3,244,550 | 4/1966 | Farnham et al. | 117/36.2 |
| 4,025,490 | 5/1977 | Weaver | 260/53 |
| 4,173,684 | 11/1979 | Stolfo | 428/531 |

FOREIGN PATENT DOCUMENTS

0090984  5/1983  Japan ................................. 346/216

OTHER PUBLICATIONS

"The Oxidation of Phenol and Its Reaction Product by Horseradish Peroxidase and Hydrogen Peroxide", by Dean J. Danner et al., *Archives of Biochemistry and Biophysics* 156, 759–763 (1973).

"Peroxidase for Removal of Hazardous Aromatics from Industrial Wastewaters", by Barbara N. Alberti et al., *Biological Detoxication*, 349–356 (1982).

Bollag and Liu, "Copolymerization of Halogenated Phenols and Syringic Acid" *Pesticide Biochemistry and Physiology* 23, C.261–272 (1985).

Klibanov et al., "Enzymatic Removal of Toxic Phenols and Anilines from Waste Waters", *Journal of Applied Biochemistry*, 2, pp. 414–421 (1980).

"Biocatalytic Oxidation of Hydroquinone to P-Benzoquinone in a Water-Organic Solvent Two-Phase System", Manjeet Singh et al., *Biotechnology Letters*, vol. 7, No. 9, 663–664 (1985).

*Primary Examiner*—Bruce H. Hess
*Attorney, Agent, or Firm*—Biebel, French & Nauman

[57] ABSTRACT

Formaldehyde-free resins of the formula (I):

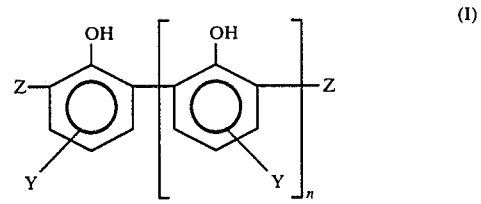

where n is an integer greater than or equal to 2, the phenolic units of the resin are directly bonded to one another through positions ortho or para to the hydroxyl group, Y is present at a position meta or para to the hydroxy group and is selected from the group consisting of an alkyl group, a halogen atom, an aryl group, a phenylalkyl group, an allyl group, a carboxyl group of the formula —COOR, where R is a hydrogen atom, an alkyl group or a phenylalkyl group, an amino group of the formula —NR$_1$R$_2$ where R$_1$ and R$_2$ are the same or different and represent a hydrogen atom or an alkyl group, and Z is a hydrogen atom, an alkyl group, a halogen atom, an aryl group, a phenylalkyl group, or a —COOR group, or Z in conjunction with the adjacent meta position forms a condensed benzene ring; or a metal-modified, formaldehyde-free phenolic developer resin obtained by reacting said developer resin with a metal salt; the resins are useful as developers in forming colored images by reaction with substantially colorless electron-donating compounds.

28 Claims, No Drawings

PHENOLIC DEVELOPER RESINS

BACKGROUND OF THE INVENTION

The present invention relates to developer resins of the type which are useful in recording materials such as carbonless paper where they function as electron acceptors and react with substantially colorless electron donating compounds to produce a visible image.

Recording materials utilizing developer resins to produce colored images from colorless or substantially colorless materials are well-known. Specific examples of such recording materials include pressure-sensitive carbonless copying paper, heat-sensitive recording paper, electrothermographic recording paper, and the like. They are described in more detail in U.S. Pat. Nos. 2,712,507; 2,730,456; 2,730,457; 3,418,250; 3,432,327; 3,981,821; 3,993,831; 3,996,156; 3,996,405 and 4,000,087, etc. A photographic material has been developed which utilizes this method for forming colored images. See, for example, U.S. Pat. Nos. 4,399,209 and 4,440,846 to The Mead Corporation.

Much research has been directed to developing new and improved developers for use in the aforementioned recording materials. The preferred developers are principally phenol derivatives and phenolic resins. Phenols, biphenols, methylene bis-diphenols, phenol-formaldehyde novolak resins, metal processed novolak resins, salicylic acid derivatives and salts are representative examples of the phenolic developers that have been used. See U.S. Pat. No. 3,934,070 to Kimura teaching salicyclic acid derivatives; U.S. Pat. No. 3,244,550 to Farnham teaching biphenols, diphenols, and resinous products containing them, and U.S. Pat. No. 3,244,549 to Farnham teaching phenol derivatives. Representative examples of phenol-formaldehyde condensates previously used in the art are described in numerous patents, including U.S. Pat. No. 3,672,935.

Among the color developers, phenol-formaldehyde condensates have been widely used because they exhibit excellent color development, good coating properties (rheology) and good water resistance. While phenol-formaldehyde condensates are advantageous color developers, certain questions have arisen regarding their use in recording materials. Because they are prepared from formaldehyde, there is concern that they may be unsafe from both the standpoint of their manufacture and their use recording materials.

SUMMARY OF THE INVENTION

A principal object of the present invention is to provide a novel, formaldehyde-free, phenolic resin for use as a color developer in the aforementioned recording materials.

This and other objects are achieved in accordance with the present invention which, in one embodiment, provides:

A developer resin capable of reacting with an electron-donating color precursor and producing a visible image and represented by the formula (I):

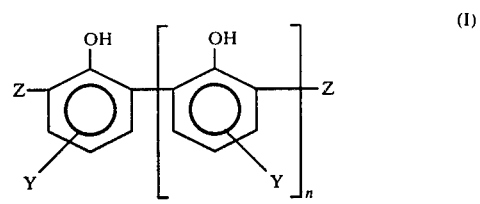

where n is greater than or equal to 2, the phenolic units are bonded to one another through the ortho and/or para positions, Y is present at the meta or para position and is selected from the group consistinbg of an alkyl group, a halogen atom (e.g., fluorine, chlorine, or bromine), an aryl group, a phenylalkyl group, an allyl group, a group of the formula —COOR where R is a hydrogen atom, an alkyl group or a phenylalkyl group, an amino group of the formula $-NR_1R_2$ where $R_1$ and $R_2$ are the same or different and represent a hydrogen atom or an alkyl group, and Z is a hydrogen atom, an alkyl group, a halogen atom, an aryl group, a phenylalkyl group, a —COOR group, or Z in conjunction with the adjacent meta position represents a condensed benzene ring which may be substituted or unsubstituted, and derivatives thereof obtained by reacting said developer resin with a metal salt.

In accordance with a more preferred embodiment of the invention, the developer resin is represented by the formula (II):

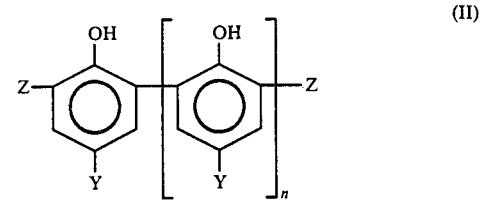

where n, Y and Z are defined as in formula (I).

Another embodiment of the present invention relates to a recording material comprising a support, a layer of microcapsules containing in the internal phase a substantially colorless electron-donating color precursor on one surface of said support, and an electron-accepting color developer material present on the same surface of said support as said microcapsules, on the opposite surface of said support as said microcapsules, or on the surface of a separate support, wherein said developer material is a phenolic resin of the formula (I) above and, more preferably, of the formula (II).

Still another embodiment of the invention is a developer sheet having the aforementioned developer resin on the surface thereof.

DETAILED DESCRIPTION OF THE INVENTION

The developer resins of the present invention are represented by the formula (I) above, more preferably, by the formula (II) above. They can be homopolymers or copolymers, i.e., the Y and Z groups in a given resin may be the same or different and the Y groups may be located at the meta and/or para positions in accordance with formula (I). When the Y substituent is in the para position and Z is other than hydrogen or a condensed benzene ring, the developer resin contains the Z substituent as a terminal group since, as explained below, the polymerization proceeds via a hydrogen abstraction at the ortho position. Consequently, when the phenol is para-substituted, the latter Z-substituted phenols are typically used in admixture with other 2,6-dihydro phenols to provide copolymers. When the para position is unsubstituted, polymerization proceeds via the ortho and/or para position and the latter Z-substituted phenols can be incorporated mid chain.

The alkyl group represented by Y and Z may contain up to 10 carbon atoms and includes such alkyl groups as t-butyl, n-butyl, octyl, nonyl, etc. When R, $R_1$, and $R_2$ represent an alkyl group, it is typically an alkyl group having 1 to 4 carbon atoms.

When Y or Z is an aryl group, it is typically a phenyl group or a substituted phenyl group such as a halogen-substituted phenyl group, an alkyl-substituted phenyl or a phenol group such as a 4'-phenol group.

Representative examples of phenylalkyl groups include benzyl, isopropylidene phenyl, butylidene phenyl, isopropylidene-4'-phenol, and butylidene-4'-phenol.

The developers of the present invention may range from about 500 to 5000 molecular (number average) and preferably range from about 1000 to 3000. The developer resins are often mixtures of dimers, trimers, and higher molecular weight oligomers. The molecular weight distribution of the resin will vary depending upon the nature of the phenol and the reaction conditions. Usually, the major part of the resin (i.e., greater than 50% by weight of the resin) is trimer or higher molecular weight compound, i.e., n is greater than 2 in formulae (I) and (II).

The developer resins of the present invention are preferably prepared by free radical addition polymerization of a phenol using a peroxide-peroxidase enzyme system. The oxidation of phenol by horseradish peroxidase and hydrogen peroxide is known, although previously it has been performed in aqueous systems. See Danner et al., "The Oxidation of Phenol and Its Reaction Product by Horseradish Peroxidase and Hydrogen Peroxide," *Archives of Biochemistry and Biophysics*, 156, 759–763 (1973); and Sanders et al., "Peroxidase," Butterworth, Inc., Washington, D.C. (1964). It has been found, however, that the reaction proceeds in higher yields and provides a higher molecular weight product if it is performed in an organic and, more preferably, an organic-aqueous solvent system.

Peroxidase enzymes are known in the art and commercially available. The most typical example of the peroxidase enzyme used in the present invention is horseradish peroxidase, but other peroxidases such as chloroperoxidase (and other haloperoxidases), lactoperoxidase, and bacterial peroxidases are probably also useful. In addition, oxidase enzymes such as fungul laccase may also be useful. The amount of the enzyme used to make the developer will depend upon its activity. For most commercially available enzymes, the peroxidase can be reacted in an amount of about 10 mg to 5 mg per 100 grams phenol.

The oxidizing agent used in making the phenolic resins used in the present invention is typically hydrogen peroxide, but peroxides in general constitute a useful class of agents. Examples of other potentially useful peroxides include methyl peroxide, etc. The peroxide can be reacted in an amount of about 0.1 to 2.5 moles per 100 grams by weight phenol and, more typically, 0.1 to 0.5 moles per 100 grams by weight phenol.

The most useful phenols which can be polymerized for use in the present invention are characterized in that they are para-substituted. Phenols which are not para-substituted tend generally to be too reactive and to generate very highly crosslinked compounds which may not be oil-soluble and which may not have good color developing properties. Thus, the phenols which are preferred for use in the present invention are represented by the formula (III):

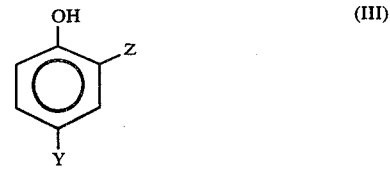

where Y is selected from the group consisting of an alkyl group, an aryl group, a phenylalkyl group, a COOR group, a —$NR_1R_2$ group, and a halogen atom, and Z is a hydrogen atom, a halogen atom, an alkyl group, an aryl group, a phenylalkyl group, or a —COOR group, or Z in conjunction with the adjacent meta position forms a condensed benzene ring.

At the para position alkyl groups have a tendency to slow the reaction. The reaction appears to proceed best with a para-substituted aryl group.

Specific examples of phenols which can be polymerized in accordance with the present invention are 4-t-butylphenol, 4-n-butylphenol, 4-ethylphenol, cresol, p-phenylphenol, p-octylphenol, p-nonylphenol, p-hydroxybenzoic acid, 4-hydroxynaphthoic acid, p,p'-biphenol, 4-aminosalicylic acid, salicylic acid, methyl salicylate, ethyl salicylate, 4,4'-isopropylidenediphenol, ethyl 4-hydroxybenzoate, etc.

The reaction of the phenol proceeds at room-temperature, but higher or lower temperatures can be used. The peroxidase enzyme, like other enzymes, is temperature-sensitive and can lose its activity if the reaction temperature becomes too high. For example, temperatures in excess of about 60° C. render horseradish peroxidase inactive. However, there is some latitude depending upon the solvent system that is used. Certain solvents can stabilize the enzyme and thereby permit the use of higher temperatures.

The phenol can be reacted in an aqueous or a non-aqueous solvent to produce the developer resin, but a preferred solvent is an organic-aqueous solvent system including water and a water-miscible or water-immiscible solvent. Representative examples of useful water-immiscible solvents include hexane, trichloroethane, methyl ethyl ketone, ethyl acetate and butanol. Examples of useful water-miscible solvents include ethanol, methanol, dimethyl formamide, and acetone. Solvent-aqueous based systems are particularly preferred over aqueous because they provide better yields and facilitate recovery and recycling of the enzyme. The organic-aqueous systems may contain water and organic solvent in a volumetric ratio (water:organic) in the range of 1:10 to 10:1, more typically, 1:2 to 2:1, and most typically, about 1:1. The most preferred ratio will vary with the nature of the phenolic monomer(s) that is (are) polymerized.

The reaction is typically carried out at phenol concentrations of 1 to 100 g per 100 ml solvent. Using the water-immiscible solvent system, an oil-in-water dispersion is formed with the reaction apparently occurring at the interface.

The reaction is preferably carried out at a pH in the range of 4 to 12 and, more preferably, 4 to 9. Buffers can be used to maintain pH, but are not required. One example of a useful buffer is a potassium phosphate buffer. While reference is herein made to the bulk pH of the reaction system, those skilled in the art will appreciate that it is the pH in the microenvironment of the enzyme that is critical. It has been found that enzyme recovered at pH outside the aforementioned ranges is inactive or less active; whereas, if the same enzyme is redissolved at a pH within the aforementioned range and recovered, it is active. Thus, a pH is selected at which the enzyme is highly active. The most preferred pH for Sigma Type I peroxidase (a product of Sigma Chemical Co.) is about 6.0. Using this enzyme, deionized water can be used to form the solvent system.

The phenolic developers of the present invention can be prepared by dissolving the peroxidase, buffer (optional), and phenol in the solvent system and then drop-wise adding the peroxide or a solution thereof to the peroxidase-phenol solution. The peroxide is preferably added at a rate approximately equal to the rate with which it is consumed by the reaction. If the peroxide is added at too fast a rate, an excess of peroxide occurs and inhibits the reaction.

The developer resins of the present invention may be metal-modified in a manner analogous to known novolak developer resins to improve their reaction with color precursors and thereby improve the density and lightfastness of the image. For example, the phenolic resins of the present invention can be modified by reaction with a salt of a metal selected from the group consisting of copper, zinc, cadmium, aluminum, indium, tin, chromium, cobalt, and nickel. This modification can be made in an otherwise known manner. One method is by mixing and melting the resin with an alkanoate salt such as zinc propionate, zinc acetate, or zinc formate in the presence of an ammonium compound such as ammonium carbonate or ammonium acetate. The practice described in U.S. Pat. No. 4,173,684 can also be used.

Zinc-modified resins can also be formed by reacting zinc oxide or zinc carbonate and ammonium benzoate or ammonium formate with the resins in a manner analogous to the teachings in U.S. Pat. Nos. 4,165,102 and 4,165,103. Alternatively the zinc-modified resins can be prepared by reaction with zinc chloride as shown in the Examples below.

The metal content of the metal-modified phenolic resins should be more than 0.5% by weight and may range up to 15% by weight. Usually, a range of about 1.5 to 5% by weight is used.

In addition, to chemically modifying the developer resins as described above, other means conventionally used in the art to improve the developing ability of developer resins can be used in conjunction with the developer resins of the present invention. For example, acidic metal salts can be incorporated into coatings of the resins as described in U.S. Pat. Nos. 3,516,845 and 3,723,156. The resins of the present invention can also be used in combination with other developer resins or compounds and need not be used alone.

The recording materials of the present invention can be prepared in a conventional manner. To provide a developer sheet, the resin may be dissolved in an appropriate solvent (typically acetone) and applied to the surface of a paper by blade or roll coating or the like. Alternatively, the developer resin may be used in the form of a resin grind analogous to the resin grinds described in U.S. Pat. No. 3,924,027 to Saito et al. For example, the resin may be pulverized and mixed with an organic high molecular compound such as starch or styrene-butadiene latex. This mixture is dispersed in water or a solvent that does not readily dissolve the developer resin or the high molecular compound and coated on an appropriate support.

The developer resin is usually applied in an amount of about 0.2 to 0.4 lb. resin/1300 sq. ft. (solids).

Where self-contained recording materials are desired, a mixture of the developer resin and microcapsules containing the developer can be coated upon a support as one layer or the developer and the microcapsules can be applied in separate layers. For the preparation of photosensitive recording materials, see U.S. Pat. Nos. 4,399,209 and 4,440,846 which are incorporated herein by reference.

The invention is illustrated in more detail by the following, non-limiting Examples.

EXAMPLE I 30 mg of Sigma Type I horseradish peroxidase dissolved in 30 ml of 0.1N potassium phosphate buffer, pH 9.0, 1.5 g of p-phenylphenol dissolved in 40 ml of ethanol and 12 ml of 3% hydrogen peroxide were each added to a dropping funnel. The dropping funnels were connected to a three-necked 300 ml round-bottom flask containing 100 ml of the phosphate buffer. While stirring constantly, the reagents were added drop-wise into the reaction flask. The reaction was allowed to proceed for ten minutes after the addition of the reagents. The product was collected by filtration and examined by thin layer chromatography.

EXAMPLE II 300 milligrams of Sigma Type I horseradish peroxidase dissolved in 200 ml of 0.1N potassium phosphate buffer, pH 9.0 and 8.3 g of p-phenylphenol with 6.7 g of salicylic acid dissolved in 200 ml of ethanol were each added to a dropping funnel. The dropping funnels were connected to a two-liter three-necked round-bottom flask containing 30 ml of 3% hydrogen peroxide dissolved in one liter of phosphate buffer. While stirring constantly, the reagents were added drop-wise to the reaction flask. The reaction was allowed to proceed for 15 mins. after the addition of the reagents. The product was collected by filtration and examined by thin layer chromatography.

The above product was air dried and re-dissolved in 100 ml ethanol containing 18.5 g of 1N sodium hydroxide. To this, a solution of 100 ml water, 2 g zinc chloride and 1 ml of concentrated hydrochloric acid was added drop-wise. The pH was readjusted with 1N sodium hydroxide until a precipitate formed and the product was collected by filtration.

EXAMPLE III 30 milligrams of Sigma Type I horseradish peroxidase dissolved in 20 ml of 0.1N potassium phosphate buffer, pH 9.0 and 1.5 g of 1-naphthol dissolved in 20 ml of ethanol were each added to a dropping funnel. The dropping funnels were connected to a 300 ml three-necked round-bottom flask containing 3 ml of 3% hydrogen peroxide dissolved in 100 ml of the phosphate buffer. While stirring constantly, the reagents were added drop-wise to the reaction flask. The reaction was allowed to proceed for 10 mins. after the addition of the reagents. The product was collected by filtration and analyzed by thin layer chromatography.

EXAMPLE IV 30 milligrams of Sigma Type I horseradish peroxidase dissolved in 30 ml of 0.1N potassium phosphate buffer, pH 9.0, 1.2 g of p-phenylphenol with 0.3 g of 4-aminosalicylic acid dissolved in 40 ml of ethanol and 12 ml of 3% hydrogen peroxide were each added to a dropping funnel. The dropping funnels were connected to a 300 ml three-necked round-bottom flask containing 100 ml of phosphate buffer. While stirring constantly, the reagents were added drop-wise to the reaction flask. The reaction was allowed to proceed for 15 mins. after the addition of the reagents. The product was collected by filtration and examined by thin layer chromatography.

EXAMPLE V 30 milligrams of Sigma Type I horseradish peroxidase dissolved in 30 ml of 0.1N potassium phosphate buffer, pH 9.0 and 12 ml of 3% hydrogen peroxide were each added to a dropping funnel. The dropping funnels were connected to a 500 ml three-necked round-bottom flask containing 6.67 g of bisphenol A dissolved in 100 ml ethanol and 174 ml of the phosphate buffer. While stirring constantly, the reagents were added drop-wise to the reaction flask. The reaction was allowed to proceed for 30 mins. after the addition of the reagents. The viscous organic phase containing product was collected from a separatory funnel and was examined by thin layer chromatography.

EXAMPLE VI 10 g of p-phenylphenol with five grams of ethyl salicylate dissolved in 400 ml of ethanol, 120 ml of 3% hydrogen peroxide dissolved in 80 ml of 0.1N phosphate buffer, pH 9.0 and 120 mg of Sigma Type I horseradish peroxidase dissolved in 200 ml of the phosphate buffer were each added to Erlenmyer flasks. While stirring constantly, the reagents were added drop-wise to a two-liter round-bottom flask using a peristaltic pump.

The reaction was allowed to proceed for 20 mins. after the addition of the reagents. The product was collected by filtration and examined by thin layer chromatography.

5 grams of product dissolved in 100 ml of acetone were added to a 500 ml round-bottom flask fitted with a condenser and containing 100 ml of an aqueous 50% potassium hydroxide solution. This solution was heated at reflux for 3 hrs. and allowed to cool to room temperature. Two grams of zinc chloride were added and allowed to stir for 10 mins. in the reaction flask. The reaction mixture was adjusted to pH 4 and poured into 1.2 liters of vigorously stirring cold water. The product was collected by filtration and examined by thin layer chromatography.

EXAMPLE VII 7 milligrams of Sigma Type I horseradish peroxidase dissolved in 80 ml of 0.05N potassium phosphate buffer, pH 5.0 was added to a 250 ml round-bottom flask containing 5 g of 4-t-butylphenol and 5 g of p-phenylphenol dissolved in 20 ml of ethyl acetate. While stirring constantly, 135 ml of 0.8% hydrogen peroxide was added dropwise to the reaction flask. The reaction was allowed to proceed for 20 mins. after the addition of the peroxide. The organic phase containing product was collected, concentrated on a steam bath and examined by thin layer chromatography.

EXAMPLE VIII 7 milligrams of Sigma Type I horseradish peroxidase dissolved in 80 ml of 0.05N potassium phosphate buffer, pH 5.0 was added to a 250 ml round-bottom flask containing 8 g of 4-t-butylphenol and 2 g of p-phenylphenol dissolved in 20 ml of ethyl acetate. While stirring constantly, 137 ml of 0.8% hydrogen peroxide was added dropwise to the reaction flask. The reaction was allowed to proceed for 20 mins. after the addition of the peroxide. The organic phase containing product was collected, concentrated on a steam bath and examined by thin layer chromatography.

EXAMPLE IX 7 milligrams of Sigma Type I horseradish peroxidase dissolved in 80 ml of 0.05N potassium phosphate buffer, pH 5.0 was added to a 150 ml round-bottom flask containing 8 g of bisphenol A and 2 g of p-phenylphenol dissolved in 20 ml of ethyl acetate. While stirring constantly, 127 ml of 0.6% hydrogen peroxide was added dropwise to the reaction flask. The reaction was allowed to proceed for 20 mins. after the addition of the peroxide. The organic phase containing product was collected, concentrated on a steam bath and examined by thin layer chromatography. This resin was also zincated by a procedure described by Fred Weaver in the patent literature, U.S. Pat. No. 4,025,490.

EXAMPLE X

The ability of the resins to develop leuco dyes was tested by gravure printing a 3% solution of the resin on a strip of paper, spraying with CF detector, and determining the optical density on a MacBeth densitometer. Table I compares the optical densities of the abovementioned experimental resins.

TABLE I

| Resin | Optical Density | |
|---|---|---|
| | Unzincated | Zincated |
| Example I | 28.41 | — |
| Example II | — | 29.47 |
| Example III | 36.40 | — |
| Example IV | 30.53 | — |
| Example V | 33.61 | — |
| Example VI | — | 25.67 |
| Example VII | 24.79 | — |
| Example VIII | 31.41 | — |
| Example IX | 29.53 | — |

Having described the invention in detail and by reference to preferred embodiments thereof, it will be apparent that modifications and variations are possible without departing from the scope of the invention defined in the appended claims.

What is claimed is:

1. A developer sheet comprising a support having a color developer on one surface thereof, said developer being capable of reacting with an electron-donating color precursor and producing a visible image and being formaldehyde-free phenolic developer resin represented by the formula (I):

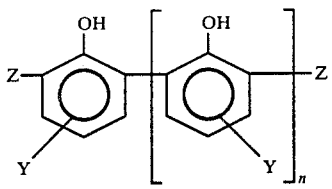

where n is greater than or equal to 2, the phenolic units of the resin are directly bonded to one another through positions ortho or para to the hydroxyl group, Y is present at a position meta or para to the hydroxy group and is selected from the group consisting of an alkyl group, a halogen atom, an aryl group, a phenylalkyl group, an allyl group, a group of the formula —COOR, where R is a hydrogen atom a phenylalkyl group or an alkyl group, an amino group of the formula —NR$_1$R$_2$ where R$_1$ and R$_2$ are the same or different and represent a hydrogen atom or an alkyl group, and Z is a hydrogen atom, an alkyl group, a phenylalkyl group, a halogen atom, an aryl group, or a —COOR group, or Z in conjunction with the adjacent meta position forms a condensed benzene ring; or a metal-modified, formaldehyde-free phenolic developer resin obtained by reacting said developer resin with a metal salt.

2. The developer sheet of claim 1 wherein said developer resin has a molecular weight of approximately 500 to 5000.

3. The developer sheet of claim 1 wherein said developer resin is represented by the formula (II):

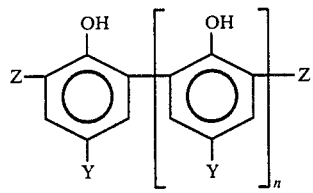

where n, Y and Z are defined as in claim 1.

4. The developer sheet of claim 3 wherein said resin has a molecular weight of about 1000 to 3000.

5. The developer sheet of claim 4 wherein Z is a hydrogen atom.

6. The developer sheet of claim 4 wherein Y is an alkyl group, a phenyl group, or a phenylalkyl group.

7. The developer sheet of claim 3 wherein Z is a hydrogen atom and Y is in the para position and is a 2-(4'-phenol)isopropyl group.

8. The developer sheet of claim 1 wherein said color developer comprises said developer resin.

9. The developer sheet of claim 1 wherein said color developer comprises said metal-modified developer resin.

10. The developer sheet of claim 9 wherein said metal-modified developer resin is obtained by reacting a developer resin with a salt of a metal selected from the group consisting of zinc, copper, cadmium aluminum, indium, tin, chromium, cobalt, and nickel.

11. The developer sheet of claim 10 wherein said metal is zinc.

12. The developer sheet of claim 1, wherein at least 50% of said developer resin is trimer or higher molecular weight resin.

13. The developer sheet of claim 1, wherein said developer resin is prepared by reacting a phenol with a peroxide-peroxidase enzyme system.

14. The developer sheet of claim 13, wherein said phenol is selected from the group consisting of 4-t-butylphenol, 4-n-butylphenol, 4-ethylphenol, cresol, p-phenylphenol, p-octylphenol, p-nonylphenol, p-hydroxybenzoic acid, 4-hydroxynaphthoic acid, p,p'-biphenol, 4-aminosalicylic acid, salicylic acid, methyl salicylate, ethyl salicylate, 4,4'-isopropylidenediphenol and ethyl 4-hydroxybenzoate, etc.

15. A recording material comprising a support having a layer of microcapsules on one surface thereof and having a color developer co-deposited on said surface of said support with said microcapsules or deposited on the surface of a separate support, said microcapsules containing in the internal phase a substantially colorless electron-donating compound, said color developer being capable of reacting with said electron-donating compound and generating a visible image and being a formaldehyde-free phenolic developer resin represented by the formula (I):

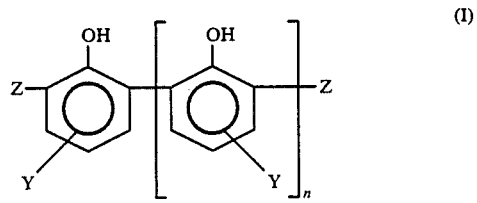

where n is greater than or equal to 2, the phenolic units of the resin are directly bonded to one another through positions ortho or para to the hydroxyl group, Y is present at a position meta or para to the hydroxy group and is selected from the group consisting of an alkyl group, a halogen atom, an aryl group, a phenylalkyl group, an allyl group, a carboxyl group of the formula —COOR, where R is a hydrogen atom, an alkyl group or a phenylalkyl group, an amino group of the formula —NR$_1$R$_2$ where R$_1$ and R$_2$ are the same or different and represent a hydrogen atom or an alkyl group, and Z is a hydrogen atom, an alkyl group, a halogen atom, an aryl group, a phenylalkyl group, or a —COOR group, or Z in conjunction with the adjacent meta position forms a condensed benzene ring; or a metal-modified, formaldehyde-free phenolic developer resin obtained by reacting said developer resin with a metal salt.

16. The recording material of claim 15 wherein said developer resin has a molecular weight of approximately 500 to 5000.

17. The recording material of claim 16 wherein said developer resin is represented by the formula (II):

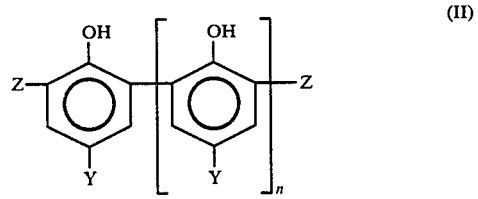

where n, Y, and Z are defined as in claim 14.

18. The recording sheet of claim 17 wherein said resin has a molecular weight of about 1000 to 3000.

19. The recording material of claim 18 wherein Z is a hydrogen atom.

20. The recording material of claim 18 wherein Y is an alkyl group, a substituted or unsubstituted phenyl group or a substituted or unsubstituted phenylalkyl group.

21. The recording material of claim 18 wherein said color developer comprises said developer resin.

22. The recording material of claim 18 wherein said color developer comprises said metal-modified developer resin.

23. The recording material of claim 22 wherein said metal-modified developer resin is obtained by reacting said developer resin with a salt of a metal selected from the group consisting of zinc, copper, cadmium, aluminum, indium, tin, chromium, cobalt, and nickel.

24. The recording material of claim 23 wherein said metal is zinc.

25. The recording material of claim 15, wherein at least 50% of said developer resin is trimer or higher molecular weight resin.

26. The recording material of claim 17 wherein Z is a hydrogen atom and Y is in the para position and is a 2-(4'-phenol)isopropyl group.

27. The recording material of claim 15, wherein said developer resin is prepared by reacting a phenol with a peroxide-peroxidase enzyme system.

28. The recording material of claim 27, wherein said phenol is selected from the group consisting of 4-t-butylphenol, 4-n-butylphenol, 4-ethylphenol, cresol, p-phenylphenol, p-octylphenol, p-nonylphenol, p-hydroxybenzoic acid, 4-hydroxynaphthoic acid, p,p'-biphenol, 4-aminosalicylic acid, salicylic acid, methyl salicylate, ethyl salicylate, 4,4'-isopropylidenediphenol and ethyl 4-hydroxybenzoate, etc.

* * * * *

UNITED STATES PATENT AND TRADEMARK OFFICE
CERTIFICATE OF CORRECTION

PATENT NO. : 4,647,952

DATED : March 3, 1987

INVENTOR(S) : Alexander R. Pokora, et al.

It is certified that error appears in the above-identified patent and that said Letters Patent is hereby corrected as shown below:

Column 2, line 14, "consistinbg" should be --consisting--,

Column 3, line 58, "5mg" should be --5g--, and

Column 4, line 54, after "formamide" insert -- tetrahydrofuran (THF)--.

Signed and Sealed this

Eighth Day of September, 1987

Attest:

DONALD J. QUIGG

*Attesting Officer*    *Commissioner of Patents and Trademarks*